United States Patent
Kuramoto

(10) Patent No.: US 9,246,423 B2
(45) Date of Patent: Jan. 26, 2016

(54) SYSTEMS AND METHODS OF TRANSFORMING A FILM SIGNAL INTO A VIDEO SIGNAL

(76) Inventor: Yoshisuke Kuramoto, Kokubunji (JP)

( * ) Notice: Subject to any disclaimer, the term of this patent is extended or adjusted under 35 U.S.C. 154(b) by 2507 days.

(21) Appl. No.: 12/015,462

(22) Filed: Jan. 16, 2008

(65) Prior Publication Data

US 2008/0117293 A1 May 22, 2008

Related U.S. Application Data

(63) Continuation-in-part of application No. 11/436,696, filed on May 19, 2006, now abandoned.

(30) Foreign Application Priority Data

May 30, 2005 (JP) .................... 2005-184011

(51) Int. Cl.
  *H02P 8/00* (2006.01)
  *H04N 5/253* (2006.01)
  *H04N 7/01* (2006.01)

(52) U.S. Cl.
  CPC ............ *H02P 8/00* (2013.01); *H04N 5/253* (2013.01); *H04N 7/0112* (2013.01); *H04N 7/0127* (2013.01)

(58) Field of Classification Search
  USPC ........................................... 348/97
  See application file for complete search history.

(56) References Cited

U.S. PATENT DOCUMENTS

| | | | | |
|---|---|---|---|---|
| 4,319,280 A * | 3/1982 | Roos et al. | .................. | 348/97 |
| 5,191,427 A * | 3/1993 | Richards et al. | .................. | 348/97 |
| 5,249,056 A * | 9/1993 | Gunday et al. | .................. | 348/97 |
| 5,255,083 A * | 10/1993 | Capitant | .................. | H04N 1/407 348/E5.049 |
| 5,276,522 A * | 1/1994 | Mead | .................. | H04N 3/30 348/101 |
| 5,376,961 A * | 12/1994 | Galt | .................. | H04N 3/40 348/105 |
| 5,392,080 A * | 2/1995 | Galt | .................. | H04N 5/253 348/97 |
| 5,442,786 A * | 8/1995 | Bowen | .................. | G06F 17/30961 707/758 |
| 5,555,101 A * | 9/1996 | Larson | .................. | G06F 17/243 358/400 |
| 5,671,008 A * | 9/1997 | Linn | .................. | 348/97 |
| 5,704,029 A * | 12/1997 | Wright, Jr. | .................. | G06F 17/243 345/173 |
| 5,757,916 A * | 5/1998 | MacDoran | .................. | G01S 19/215 342/357.48 |
| 5,842,195 A * | 11/1998 | Peters | .................. | G06Q 30/02 |
| 5,991,771 A * | 11/1999 | Falls | .................. | G06F 9/466 |
| 6,230,142 B1 * | 5/2001 | Benigno | .................. | G06F 19/325 705/2 |
| 6,462,708 B1 * | 10/2002 | Tsujimoto | .................. | G01S 5/0009 342/357.43 |
| 6,477,373 B1 * | 11/2002 | Rappaport | .................. | H04W 36/12 455/436 |
| 6,519,571 B1 * | 2/2003 | Guheen | .................. | G06Q 30/02 705/14.66 |
| 6,584,464 B1 * | 6/2003 | Warthen | .................. | G06F 17/30398 |

(Continued)

*Primary Examiner* — Backhean Tiv
(74) *Attorney, Agent, or Firm* — Jackson Patent Law Office

(57) ABSTRACT

An exemplary system has circuitry that receives a first signal, the first signal being generated responsive to a user control for a play speed of a film. The system also includes circuitry that receives a second signal, the second signal being synchronized with a video camera that generates television signals. Circuitry processes the first signal with the second signal, to generate a third signal. Responsive to the third signal, the exemplary system moves a relative position of the film with respect to the video camera, to generate a video signal.

11 Claims, 4 Drawing Sheets

(56) References Cited

U.S. PATENT DOCUMENTS

| | | | | |
|---|---|---|---|---|
| 6,615,166 B1 * | 9/2003 | Guheen | G06Q 10/06 | |
| | | | 703/26 | |
| 6,631,184 B1 * | 10/2003 | Weiner | H04L 12/2854 | |
| | | | 379/92.01 | |
| 6,826,726 B2 * | 11/2004 | Hsing | G06F 17/30578 | |
| | | | 707/999.201 | |
| 7,310,350 B1 * | 12/2007 | Shao | H04W 4/00 | |
| | | | 370/338 | |
| 7,693,283 B2 * | 4/2010 | Livesay | H04L 63/0421 | |
| | | | 380/255 | |
| 7,739,658 B2 * | 6/2010 | Watson | G06F 17/30905 | |
| | | | 709/217 | |
| 2002/0007303 A1 * | 1/2002 | Brookler | G06Q 30/02 | |
| | | | 705/7.32 | |
| 2002/0026338 A1 * | 2/2002 | Bukow | G06Q 10/10 | |
| | | | 705/7.14 | |
| 2002/0087361 A1 * | 7/2002 | Benigno | G06F 19/325 | |
| | | | 705/3 | |
| 2002/0137524 A1 * | 9/2002 | Bade | H04W 12/08 | |
| | | | 455/456.2 | |
| 2002/0194219 A1 * | 12/2002 | Bradley | G06F 17/243 | |
| | | | 715/223 | |
| 2003/0022656 A1 * | 1/2003 | Hinnant, Jr. | G01S 5/02 | |
| | | | 455/410 | |
| 2007/0242809 A1 * | 10/2007 | Mousseau | H04M 7/0036 | |
| | | | 379/88.18 | |
| 2007/0296811 A1 * | 12/2007 | Miyazaki et al. | 348/97 | |
| 2008/0098291 A1 * | 4/2008 | Bradley | G06F 17/243 | |
| | | | 715/223 | |
| 2008/0304568 A1 * | 12/2008 | Chang | H04N 7/0115 | |
| | | | 375/240.16 | |
| 2012/0008560 A1 * | 1/2012 | Lewis | G06Q 20/102 | |
| | | | 370/328 | |

\* cited by examiner

SYSTEMS AND METHODS OF TRANSFORMING A FILM SIGNAL INTO A VIDEO SIGNAL

This application is a continuation-in-part of U.S. application Ser. No. 11/436,696 of Yoshisuke Kuramoto filed May 19, 2006 now abandoned for TELECINE DEVICE THAT UTILIZES STANDARD VIDEO CAMERA CIRCUITS, the contents of which are herein incorporated by reference

BACKGROUND OF THE INVENTION

1. Field of the Invention

The invention relates generally to television and, more particularly, to converting light signals from a film reel into a standard video signal format.

2. Description of Related Art

Cinema projectors for certain film formats, particularly 8 millimeter film, have not been manufactured since the 1980s. To date, the only options for replaying 8 millimeter film were to use projectors that had had more than 20 years pass since their manufacture or to pay a fee to a video conversion service to convert the film to a video or DVD format. Cinema projectors that are more than 20 years old tend to be aged and decrepit, most are likely to suffer from some malfunction and official support from the most manufacturers is no longer available. In short, even if a member of the general public possesses the film, they do not have any means of projecting the film when their projector breaks down.

Moreover, only high-priced commercial telecine equipment is available for converting the film into the video signal format, making it difficult to obtain substitute equipment for the film projectors.

Furthermore, none of the recording frame rates for film—there are various formats at 16, 18 or 24 frames per second—correspond to the frame rates for video signals (the NTSC format is 30 frames per second, the PAL and SECAM are 25 frames per second), making it useless to simply replace one film frame with one or two video signal frames.

Many formats that interpolate the difference between the film recording frame rate and video signal frame rates, many conversion formats and many telecine devices have been invented, but most of them are of a format that advances the film at fixed speeds and interpolates at the conversion to the video signal stage, and are made for commercial films that are larger in size than the 16 millimeter film recorded at 24 frames per second. For example, Japanese patent applications 2002-359775, 2002-77832 and 2001-103373 all use these methods. The 8 millimeter Film-Video Conversion Device filed under Japanese patent application 2005-252418 by the inventor of the current application provides for a telecine device that is smaller and cheaper than the commercial telecine devices, but it advances the film at a fixed speed and is no different from the devices that interpolate at the conversion to video signal stage. Thus, the processes that interpolate at the stage when the images are converted to a video signal cannot use standard video camera circuits without modification, making it necessary to develop specialized circuits and low-cost production is therefore limited.

Methods of converting the film images to video signals by controlling the film frame advancement have been proposed in such patent applications as Japanese patents Heisei-11-32255 and Heisei-10-126685, and they propose to raise image quality by synchronizing the film frame advancement with the video signal creation, but they do not play the film in real time and do not automatically interpolate the difference between the film recording frame rate and the video signal frame rate. Namely, they are not intended to create video signals from movie and other film in real time. To date, there has been no telecine device using the method of interpolating the difference between recording frame rates and video signal frame rates at the film frame advancement stage, and using standard video camera circuits without modification to convert to a video signal.

SUMMARY OF THE INVENTION

According to an aspect of the present invention, there is a method comprising the steps of receiving a first signal, the first signal being generated responsive to a user control for a play speed of a film; receiving a second signal, the second signal being synchronized with a video camera that generates television signals; processing the first signal with the second signal, to generate a third signal; and responsive to the third signal, moving a relative position of the film with respect to the video camera, to generate a video signal.

According to another aspect of the present invention, there is a system comprising circuitry that receives a first signal, the first signal being generated responsive to a user control for a play speed of a film; circuitry that receives a second signal, the second signal being synchronized with a video camera that generates television signals; circuitry that processes the first signal with the second signal, to generate a third signal; and an actuator, responsive to the third signal, that moves a relative position of the film with respect to the video camera, thereby enabling generation of a video signal from the film.

According to yet another aspect of the present invention, there is a system comprising means for receiving a first signal, the first signal being generated responsive to a user control for a play speed of a film; means for receiving a second signal, the second signal being synchronized with a video camera that generates television signals; means for processing the first signal with the second signal, to generate a third signal; and means, responsive to the third signal, for moving a relative position of the film with respect to the video camera, to generate a video signal.

DETAILED DESCRIPTION OF EXEMPLARY EMBODIMENTS

Figure 1:
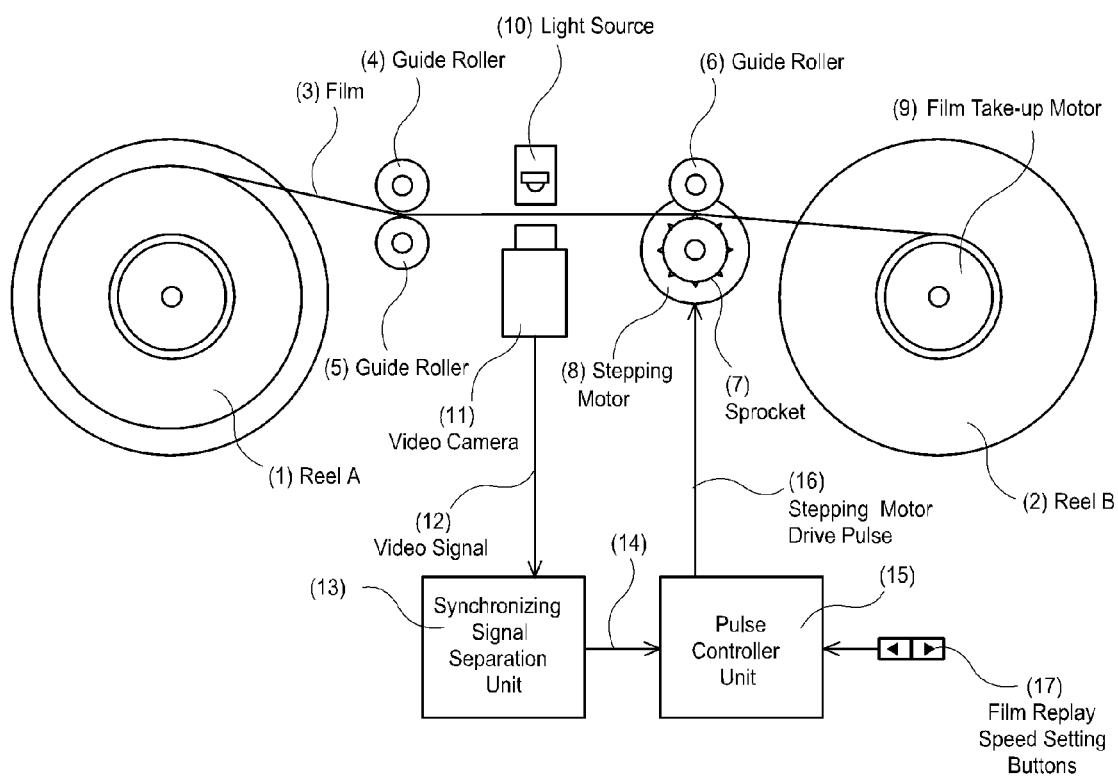
FIG. 1 is an Entire Constitution Diagram.

FIG. 1 shows the entire constitution example of the telecine device in accordance with an exemplary embodiment. The device includes recorded motion picture film (3) wound around reel A (1), a sprocket (7) to advance film, a stepping motor (8) to rotate the sprocket (7), reel B (2) to take up film (3), a film take-up motor (9) to rotate reel B (2), guide rollers (4), (5), (6) to guide film (3), a light source (10) to project images from film (3), a video camera (11) to record images projected from the light source (10), a synchronizing signal separation circuit (13) to separate synchronizing signals from video signals (12) of video cameras (11) by using level converter and timer, pulse controller circuitry (15) to control the drive speed and timing of the sprocket (7), and film replay speed setting buttons (17) for setting the film replay speed.

In this patent application, the word circuitry encompasses dedicated hardware, and/or programmable hardware, such as a CPU or reconfigurable logic array, in combination with programming data, such as sequentially fetched CPU instructions or programming data for a reconfigurable array. Throughout is this patent application, certain processing may be depicted in serial, parallel, or other fashion, for ease of description. Actual hardware and software realizations, however, may be varied depending on desired optimizations apparent to one of ordinary skill in the art. For example, some of the functionality of the circuit of FIG. 2 has been represented with flip-flops and gates. Applicant actually implemented this functionality, however, with a microcomputer programmed to perform the functions of these flip-flops and gates.

Sprocket (7), which is directly attached to the rotation axis of the stepping motor (8), synchronizes with the rotation of the stepping motor (8). The tooth spacing of a sprocket (7) corresponds to the spacing of one frame of film.

Figure 2:
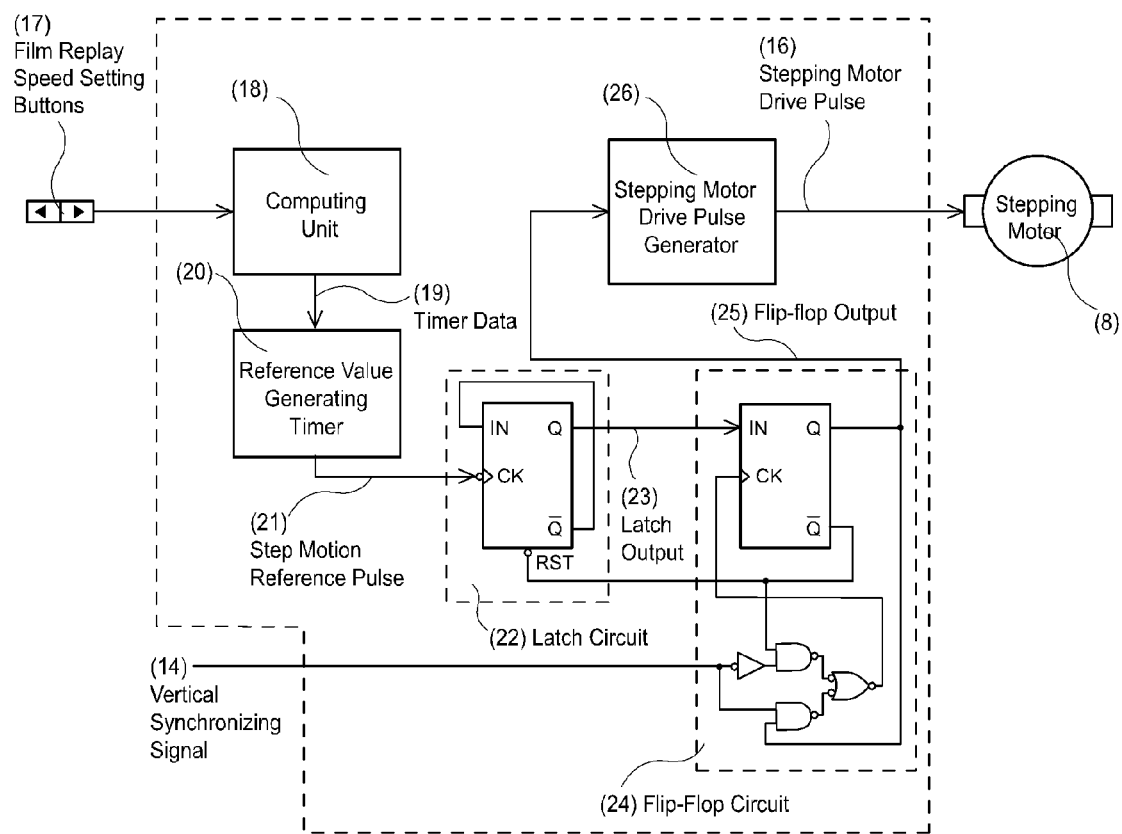
FIG. 2 is a Circuit Configuration Diagram of the Pulse Controller Circuitry.

FIG. 2 shows the circuit configuration of the pulse controller circuitry (15) as shown in FIG. 1. This part of the unit includes the computing unit (18) that calculates timer data (19) from settings set with the film replay speed setting buttons (17), reference value generating timer (20) that generates step motion reference pulses (21) from timer data (19) received from the computing unit (18), latch circuit (22) that sets at the rising edge of step motion reference pulse (21) outputted from reference value generating timer (20) when flip-flop output (25) is 0 and resets at rising edge of the flip-flop output (25), flip-flop circuit (24) that sets at rising edge of the vertical synchronizing signal (14) when the latch output (23) from the latch circuit (22) is 1, and resets at falling edge of the vertical synchronizing signal (14) when itself is ON, and a stepping motor drive pulse generator (26) that drives the stepping motor (8) when flip-flop output (25) is 1.

Figure 3:
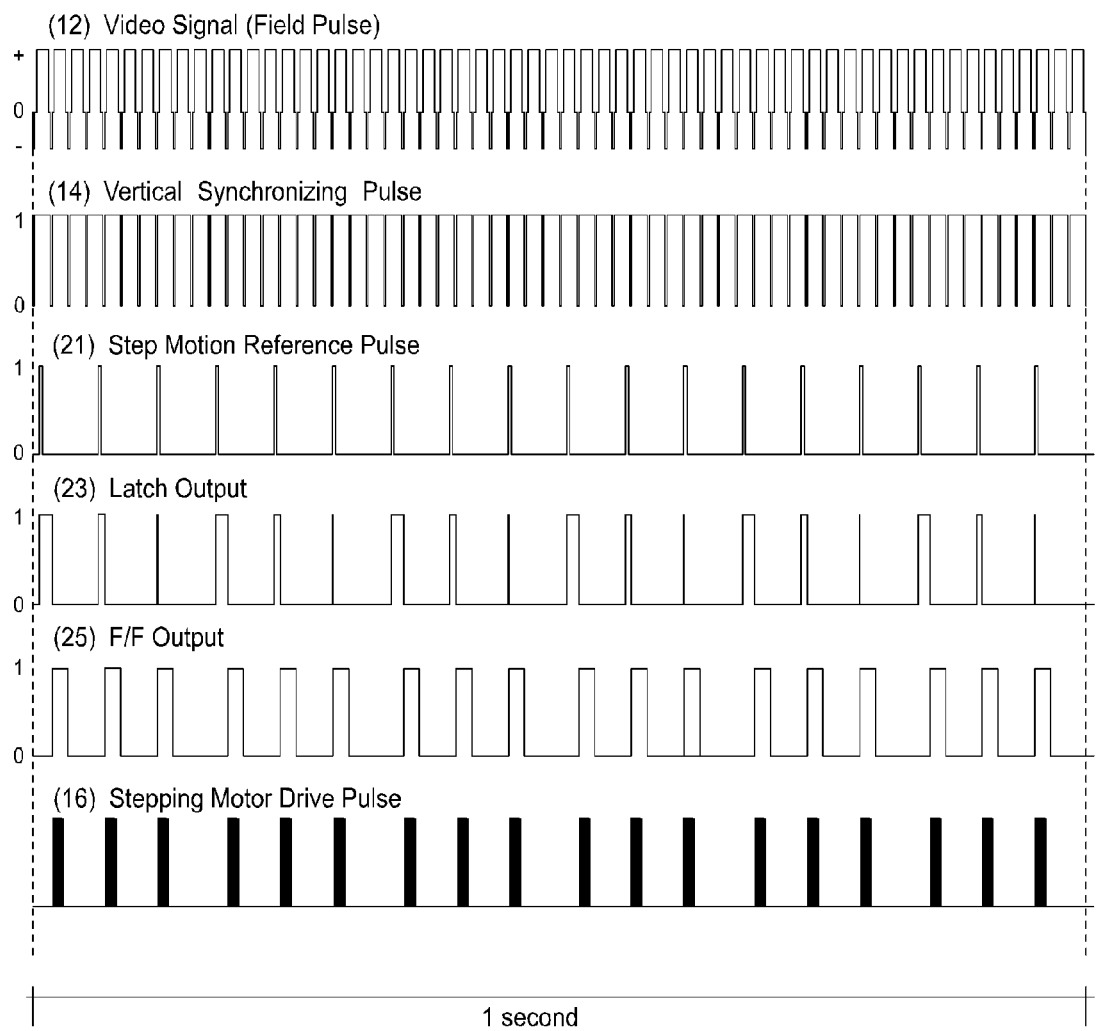
FIG. 3 is an Operational Timing Diagram (NTSC) when Film Replay Speed is 18 Frames per Second.

FIG. 3 is an operational timing diagram (NTSC) example of the telecine device in accordance with an exemplary embodiment, when film replay speed is 18 frames per second. NTSC is an abbreviation for National Television Standards Committee standard, a 525-line interlaced raster-scanned standard for the generation, transmission, and reception of television signals.

When the device is powered on, the video camera outputs video signals (12) steadily at 60 fields per second. 1 field cycle is 1/60 second (16.67 mm/sec.). Vertical synchronizing signal (14) is separated from the video signal in the synchronizing signal separation unit (13), and sent to the pulse controller circuitry (15).

In the pulse control unit (15), frame rate which is set with the film replay speed setting buttons (17) is taken in by the computing unit (18), and calculates the timer data (19) needed to generate step motion reference pulses (21). Calculated timer data (19) is then set in the reference value generating timer (20).

When reference value generating timer (20) detects an elapsed duration of time, step motion reference pulses (21) are generated and the timer (20) restarts. Film replay speed in this example is 18 frames per second, therefore, step motion reference pulses (21) equal to 18 positive pulses per second. More specifically, pulses are generated repeatedly every 1/18 second (55.55 mm/sec.) until the film finishes replay.

Latch circuit (22) turns ON at rising edge of the step motion reference pulse (21). When latch circuit (22) is ON, latch output (23) becomes 1, an input level for the flip-flop circuit (24). When latch output (23) is 1 and flip-flop circuit (24) detects a rising edge on the vertical synchronizing signal (14), flip-flop circuit (24) turns ON and flip-flop output (25) becomes 1. When flip-flop output (25) becomes 1, the stepping motor drive pulse generator (26) turns ON and generates stepping motor drive pulses (16) necessary to advance one frame of a film during the flip-flop output (25) is 1. Pulse width and pulse-number of stepping motor drive pulses (16) differ according to specifications of the stepping motors used. When flip-flop output (25) is 1, it resets at the next falling edge of vertical synchronizing signal (14). In other words, stepping motor (8) is driven between the rear end of vertical synchronizing signal (14) immediately after step motion reference pulse (21) is generated and the front end of the second step motion reference pulse (21). This advances and stops a frame of film before image is recorded with a video camera. At the same time, when flip-flop output (25) becomes 1, latch circuit (22) is reset. This prevents the possibility of accepting the next step motion reference pulse (21) while the motor (8) is driving.

Figure 4:
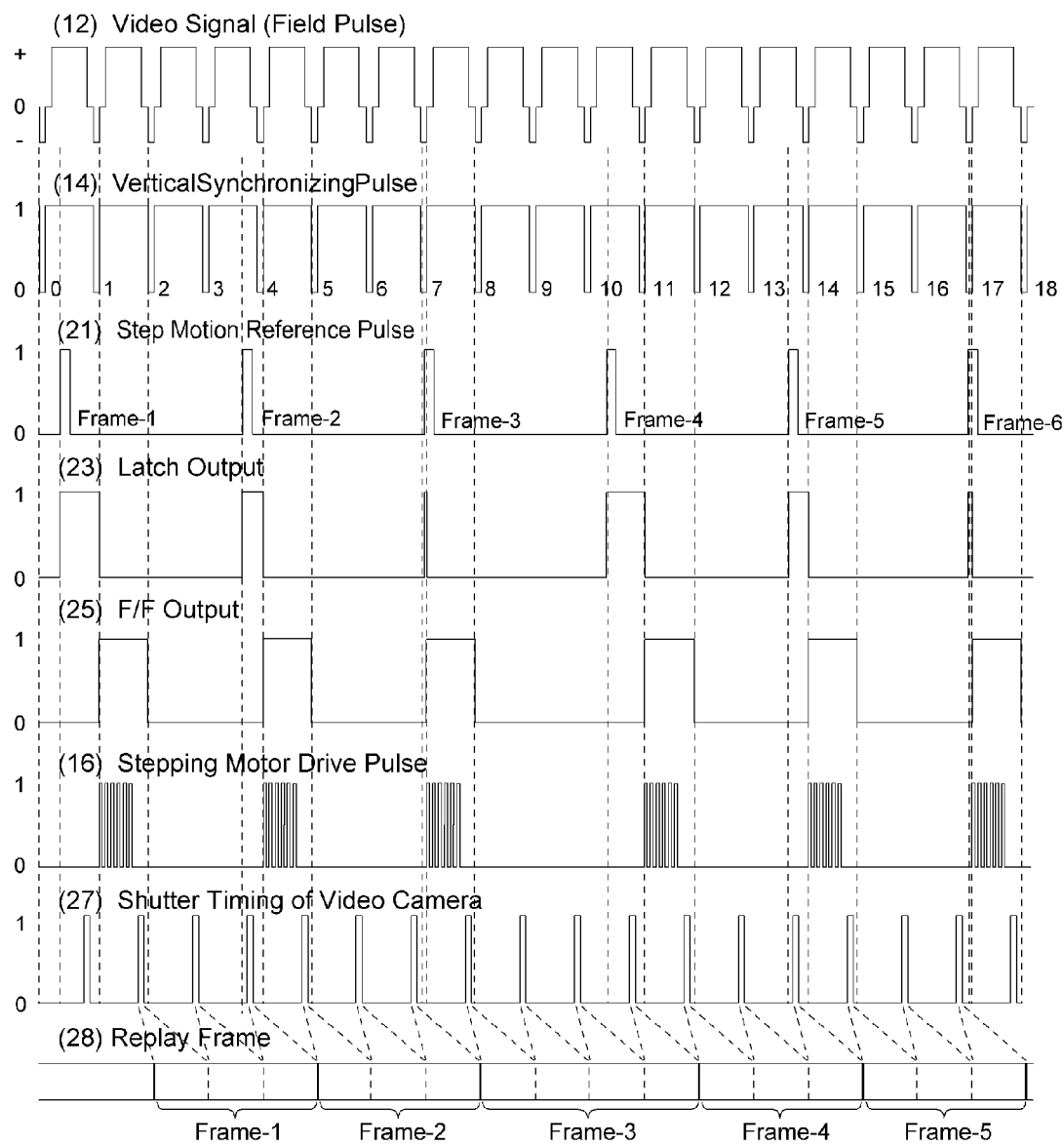
FIG. 4 is a Time Axis Enlarged Timing Chart of FIG. 3.

FIG. 4 is a time axis enlarged timing chart of FIG. 3. When before 0 of the vertical synchronizing signal (14), step motion reference pulse (21) is not generated, therefore latch output (23) remains 0, flip-flop output (25) also remains 0, and the motor does not drive. When in between 0 and 1 of the vertical synchronizing signal (14), step motion reference pulse (21) rises and latch circuit (22) turns ON and latch output (23) becomes 1. When latch output (23) becomes 1, the next rising edge of vertical synchronizing signal (14) will come no longer than within 1/60 second (16.67 mm/sec.), flip-flop circuit (24) turns ON at the rising edge, and the flip-flop output (25) becomes 1. When flip-flop output (25) becomes 1, stepping motor drive pulse generator (26) generates stepping motor drive pulses (16) and rotates the stepping motor (8), turns the sprocket and advances one frame of film. In addition, latch circuit resets when flip-flop output is 1.

The video camera will record film every 1/60 second (16.67 mm/sec.) and convert to video signals and output the signals, when the stepping motor drive pulse (1 6) is OFF and the film is at a still state, and the vertical synchronizing signals (14) do not overlap. More specifically, when flip-flop output (25) becomes 1 at rising edge of the first vertical synchronizing signal (14), stepping motor drive pulses (16) are generated and one frame of film is advanced until the front end of second vertical synchronizing signal (14) arrives, the video camera releases the shutter and converts the image to video signals, before the immediately following second vertical synchronizing signal (14) arrives. Afterwards, the video camera releases its shutter every 1/60 second (16.67 mm/sec.) and converts images to video signals, whether step motion reference pulse (21) exist or not.

At the rising edge of the second vertical synchronizing signal, since the step motion reference pulse (second pulse) that outputs every 1/18 second (55.55 mm/sec.) is not outputted yet, both flip-flop circuit (24) and latch circuit (22) remain turned OFF, film does not advance, and the video camera shoots the same image and converts it to video signals. Also at the rising edge of the third vertical synchronizing signal, step motion reference pulse (second pulse) is not outputted yet, so the video camera shoots the same image and converts it to video signals. Between the third and fourth vertical synchronizing signals, step motion reference pulse (second pulse) is outputted and sets the latch circuit. At the rising edge of the fourth vertical synchronizing signal, flip-flop circuit (24) turns ON and generates stepping motor drive pulses (16) as same as last time and advances one frame of film, and the video camera shoots the film's second frame image and converts it to video signals.

Time interval of step motion reference pulses (21) is 1/18 second (55.55 mm/sec.). 3 vertical synchronizing signals (14), first, second and third, are generated between the first and second step motion reference pulses. Next 3 vertical synchronizing signals (14), fourth to sixth, are generated between the second and third step motion reference pulses (21). 4 vertical synchronizing signals (14), seventh to tenth, are generated between the third and fourth step motion reference pulses (21). The number of vertical synchronizing signals (14) generated between the step motion reference pulses (21) can be easily determined from the field cycle of 1/18 second of the step motion reference pulse (21) and the field cycle of 1/60 second of the vertical synchronizing signal (14). Seeing that the last vertical synchronizing pulse found between the first and second step motion reference pulse is a third vertical synchronizing pulse, we find that 3 field cycles of the vertical synchronizing pulse, which is 3×1/60 second=1/20 second, is shorter than the field cycle of 1/18 second of the step motion reference pulse. This 1/180 second difference is then added to the next frame advance, to calculate the vertical synchronizing pulses generated during the 1/18 second+1/180 second interval. (1 1/1 80 second)/(1/60 second)=1 1/3 second=3.66 second, equals to 3 field cycles. More specifically, the number of vertical synchronizing signals used to shoot and output second frame of film, are 3 pulses. In the same way, number of vertical synchronizing signals used to shoot and output the third frame of film, are 1/1 8 second÷(1 1/1 80 second−(1/60 second×3))=1/15 second, 4 pulses. At this time, the third step motion reference pulse (21) and the seventh vertical synchronizing signal (14) overlap.

The vertical synchronizing signal field cycle when outputting the first frame of film is 3 cycles, vertical synchronizing signal field cycle when outputting the second frame of film is 3 cycles, vertical synchronizing signal field cycle when outputting the third frame of film is 4 cycles. Because the third step motion reference pulse and vertical synchronizing signal overlap, the numbers of vertical synchronizing signal pulses between the step motion reference pulses repeat as 3, 3, 4, 3, 3, 4, 3, 3, 4, 3, 3, 4, 3, 3, 4, 3, 3, 4, which means 18 frames advance in 60 vertical synchronizing signal pulses, and film image with 18 frames per second is converted to a 60 field per second video signal. For example, if film replay speed is set to 15 frames per second, 4 vertical synchronizing signal pulses become 1 step motion reference pulse, repeat as 4, 4, 4, 4, 4, 4, 4, 4, 4, 4, 4, 4, 4, 4, 4, and synchronizes. If film replay speed is set to 24 frames per second, vertical synchronizing signal pulses repeat as 2, 3, 2, 3, 2, 3, 2, 3, 2, 3, 2, 3, 2, 3, and synchronizes. Since latch output (23) and flip-flop output (25) created from step motion reference pulse (21) and vertical synchronizing signal (14) automatically generates the stepping motor drive pulses (16), step motion interval changes in a fixed field cycle and synchronizes with the vertical synchronizing signal when film replay speed is changed.

When film with an unknown recorded frame rate is replayed, best replay speed can be found by watching the replayed image, by observing a video signal on a television.

In summary, a telecine device with a telecine circuit, is characterized with a capability to output analog video signals or digital video signals of flickerless replayed film images using NTSC, PAL or other video format cameras, when converting films such as 8 millimeter, 16 millimeter and 35 millimeter format film, by automatically interpolating the difference between the film frame rate and the video signal frame rate (field count) using stepping motor pulses to drive the stepping motor to rotate sprocket and advance film; by using a synchronizing signal separation unit (13) that separates vertical synchronizing signals (14) from video signals (12) outputted from video camera (11). Pulse controller circuitry (15) includes a computing unit (18) that computes timer data (19) from the settings of the film replay speed setting buttons (17) corresponding to the number of frames per second (replay speed) set. A reference value generating timer (20) uses timer data (19) to create step motion reference pulses (21).

A pulse controller circuitry (15) composed of a latch circuit (22) that turns ON at rising edge of step motion reference pulse (21) when flip-flop output (25) is OFF, and turns OFF at rising edge of flip-flop output (25), and a flip-flop circuit (24) that turns ON at rising edge of vertical synchronizing signal (14) when latch output (23) is ON, and turns OFF at the rising edge of vertical synchronizing signal (14) when itself is ON.

A stepping motor drive pulse generator (26) generates enough stepping motor drive pulses (16) to advance one frame of film while flip-flop output (25) is ON which drives the stepping motor (8) that rotates the sprocket (7) and advances film (3).

LIST OF REFERENCE NUMBERS (1) Reel A
(2) Reel B
(3) Film
(4) Guide Roller
(5) Guide Roller
(6) Guide Roller
(7) Sprocket
(8) Stepping Motor
(9) Film Take-up Motor
(10) Light Source
(11) Video Camera
(12) Video Signal
(13) Synchronizing Signal Separation Unit
(14) Vertical Synchronizing Signal
(15) Pulse Controller Circuitry
(16) Stepping Motor Drive Pulse
(17) Film Replay Speed Setting Buttons
(18) Computing Unit
(19) Timer Data
(20) Reference Value Generating Timer
(21) Step Motion Reference Pulse
(22) Latch Circuit
(23) Latch Output
(24) Flip-flop Circuit
(25) Flip-flop Output
(26) Stepping Motor Drive Pulse Generator
(27) Shutter Timing of Video Camera
(28) Replay Frame Thus, the exemplary system enables standard video camera circuits to be used without modification to convert to video signals, thereby achieving cost savings.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

The invention claimed is:

1. A method of converting light signals from a film into a video signal, the method comprising the steps of:
   receiving a first signal, the first signal being generated responsive to a user control for a play speed of a film, the first signal including a plurality of first-signal pulses;
   receiving a second signal, the second signal being synchronized with a video camera that generates television signals, the second signal including a plurality of second-signal pulses;
   processing the first signal with the second signal, to generate a third signal, the third signal including a plurality of third-signal pulses, each third-signal pulse corresponding to a respective one of the first-signal pulses, each third-signal pulse being synchronized with a second-signal pulse, each first-signal pulse corresponding to a respective one of the third-signal pulses, whereby there is a one-to-one correspondence between the first signal pulses and the third signal pulses; and
   responsive to the third signal, moving a relative position of the film with respect to the video camera, to generate a video signal.

2. The method of claim 1 further including
   generating the second signal by receiving a video signal from the video camera, to generate a vertical synchronizing signal.

3. The method of claim 1 further including
   generating the third signal using memory circuitry, the memory circuitry having a data input responsive to the first signal, and a control input responsive to the second signal.

4. The method of claim 1 wherein moving includes
   responsive to the third signal, generating stepping motor pulses;
   responsive to the stepping motor pulses, driving a stepping motor to rotate a sprocket and advance the film.

5. The method of claim 1 further including
   responsive to a transition of the third signal, generating a number of stepping motor drive pulses to advance the film 1, and only 1, frame.

6. A system configured to enable conversion of light signals from a film into a video signal, the system comprising:
   circuitry that receives a first signal, the first signal being generated responsive to a user control for a play speed of a film, the first signal including a plurality of first-signal pulses;
   circuitry that receives a second signal, the second signal being synchronized with a video camera that generates television signals, the second signal including a plurality of second-signal pulses;
   circuitry that processes the first signal with the second signal, to generate a third signal, the third signal including a plurality of third-signal pulses, each third-signal pulse corresponding to a respective one of the first-signal pulses, each third-signal pulse being synchronized with a second-signal pulse, each first-signal pulse corresponding to a respective one of the third-signal pulses, whereby there is a one-to-one correspondence between the first signal pulses and the third signal pulses; and
   an actuator, responsive to the third signal, that moves a relative position of the film with respect to the video camera, thereby enabling generation of a video signal from the film.

7. A system according to claim 6 further including
   circuitry that generates the second signal by receiving a video signal from the video camera, to generate a vertical synchronizing signal.

8. A system according to claim 6 wherein the circuitry that generates the third signal includes memory circuitry, the memory circuitry having a data input responsive to the first signal, and a control input responsive to the second signal.

9. A system according to claim 6 wherein the actuator includes a stepping motor.

10. A system according to claim 6 further including circuitry, responsive to a transition of the third signal, that generates a number of stepping motor drive pulses to advance the film 1, and only 1, frame.

11. A system configured to enable conversion of light signals from a film into a video signal, the system comprising:
   means for receiving a first signal, the first signal being generated responsive to a user control for a play speed of a film, the first signal including a plurality of first-signal pulses;
   means for receiving a second signal, the second signal being synchronized with a video camera that generates television signals, the second signal including a plurality of second-signal pulses;
   means for processing the first signal with the second signal, to generate a third signal, the third signal including a plurality of third-signal pulses, each third-signal pulse corresponding to a respective one of the first-signal pulses, each third-signal pulse being synchronized with a second-signal pulse, each first-signal pulse corresponding to a respective one of the third-signal pulses, whereby there is a one-to-one correspondence between the first signal pulses and the third signal pulses; and
   means, responsive to the third signal, for moving a relative position of the film with respect to the video camera, to generate a video signal.

* * * * *